United States Patent
Wang et al.

(10) Patent No.: US 10,701,735 B2
(45) Date of Patent: *Jun. 30, 2020

(54) METHODS AND DEVICES FOR GENERATING AND DETECTING RANDOM ACCESS PREAMBLES

(71) Applicant: Telefonaktiebolaget LM Ericsson (publ), Stockholm (SE)

(72) Inventors: Jianfeng Wang, Beijing (CN); Zhiheng Guo, Beijing (CN); Huaisong Zhu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/373,813

(22) Filed: Apr. 3, 2019

(65) Prior Publication Data

US 2019/0230717 A1 Jul. 25, 2019

Related U.S. Application Data

(63) Continuation of application No. 15/611,974, filed on Jun. 2, 2017, now Pat. No. 10,292,185, which is a
(Continued)

(51) Int. Cl.
*H04W 74/08* (2009.01)
*H04J 11/00* (2006.01)
(Continued)

(52) U.S. Cl.
CPC ......... *H04W 74/0833* (2013.01); *H04J 11/00* (2013.01); *H04J 13/0003* (2013.01);
(Continued)

(58) Field of Classification Search
CPC ......... H04W 74/0833; H04J 2011/0006; H04J 11/00; H04J 13/0003; H04J 13/0062; H04L 27/2613; H04L 5/0026; H04L 5/0048
See application file for complete search history.

(56) References Cited

U.S. PATENT DOCUMENTS 9,693,370 B2 * 6/2017 Wang ................ H04W 74/0833
2011/0007627 A1 1/2011 Lee et al.
(Continued)

FOREIGN PATENT DOCUMENTS

CN 101707583 A1 5/2010
CN 101958868 A 1/2011
(Continued)

OTHER PUBLICATIONS

PCT International Preliminary Report on Patentability and Written Opinion of the International Searching Authority, International Application No. PCT/CN2014/095308, dated Jul. 4, 2017.
(Continued)

*Primary Examiner* — Justin T Van Roie
(74) *Attorney, Agent, or Firm* — Sage Patent Group

(57) ABSTRACT

One embodiment relates to a method for transmitting a random access preamble in a transmitting sub-frame at a terminal device. The method (200) comprises: creating a random access preamble such that it comprises a plurality of random access sequences (S210); dividing the plurality of random access sequences into a number N, of groups, each of groups including two or more random access sequences (S220); performing code division multiplexing with respect to the groups of the plurality of random access sequences in a frequency domain, based on an orthogonal cover code selected for the terminal device from a pre-defined code set (S230); and transforming signals after the code division
(Continued)

multiplexing into the time domain (S240). There are provided corresponding methods and devices.

23 Claims, 7 Drawing Sheets

Related U.S. Application Data continuation of application No. 14/416,111, filed as application No. PCT/CN2014/095308 on Dec. 29, 2014, now Pat. No. 9,693,370.

(51) Int. Cl.
*H04J 13/00* (2011.01)
*H04L 5/00* (2006.01)
*H04L 27/26* (2006.01)

(52) U.S. Cl.
CPC .......... *H04L 5/0026* (2013.01); *H04L 5/0048* (2013.01); *H04L 27/2613* (2013.01); *H04J 13/0062* (2013.01); *H04J 2011/0006* (2013.01)

(56) References Cited

U.S. PATENT DOCUMENTS

| | | |
|---|---|---|
| 2011/0182169 A1 | 7/2011 | Li |
| 2011/0235728 A1 | 9/2011 | Karabinis |
| 2013/0163557 A1 | 6/2013 | Ko |
| 2014/0098751 A1 | 4/2014 | Luo et al. |
| 2015/0003375 A1 | 1/2015 | Liu et al. |
| 2015/0319779 A1 | 11/2015 | Li |

FOREIGN PATENT DOCUMENTS

| | | |
|---|---|---|
| CN | 102347824 A1 | 2/2012 |
| CN | 103260250 A | 8/2013 |
| EA | 19570 B1 | 4/2014 |
| EP | 2 706 797 A1 | 3/2014 |
| EP | 2 730 171 A2 | 7/2014 |
| RU | 2459375 C2 | 8/2012 |
| WO | 2007 149290 A2 | 12/2007 |
| WO | 2007 149290 A3 | 12/2007 |
| WO | 2008/137963 A2 | 11/2008 |
| WO | 2008156348 A1 | 12/2008 |
| WO | 2014/110714 A1 | 7/2014 |

OTHER PUBLICATIONS

Official Action issued by the Russian Federal Institute for Industrial Property of the Federal Service for Intellectual Property, Patents and Trade Marks for Application No. 2017127184/08(046805)—dated May 22, 2018.
Decision to Grant a Patent for Application No. JP2017-535002—dated Jul. 3, 2018.
Decision to Grant a Patent for Invention Issued by the Federal Service for Intellectual Property (ROSPATENT) for Application No. 2017127184—dated Aug. 27, 2018.
Chinese Office action and Search Report for Chinese Patent Application No. 201480084423.4 dated Sep. 18, 2019—14 Pages.

* cited by examiner

METHODS AND DEVICES FOR GENERATING AND DETECTING RANDOM ACCESS PREAMBLES

PRIORITY

This application is a continuation, under 35 U.S.C. § 120, of U.S. patent application Ser. No. 15/611,974 which is a continuation, under 35 U.S.C. § 120, of U.S. patent application Ser. No. 14/416,111 which is a U.S. National Stage Filing under 35 U.S.C. § 371 of International Patent Application Serial No. PCT/CN2014/095308, filed December 29, 2014, and entitled "Methods and Devices for Generating and Detecting Random Access Preambles" which claims priority to International Patent Application No. PCT/CN2014/095308 filed December 29, 2014, both of which are hereby incorporated by reference in their entirety.

TECHNICAL FIELD

The present disclosure generally relates to wireless communication, particularly to methods and devices for generating and detecting random access preambles.

BACKGROUND

In cellular systems, a terminal device such as User Equipment (UE) is allowed to initially request a connection setup with a network device such as an enhanced NodeB (eNodeB). Such a procedure is commonly referred to as "Random Access".

In Long Term Evolution (LTE), the random access procedure has in two forms, allowing access to be either contention-based or contention-free. In the contention-based random access procedure, UE needs to transmit a random access preamble to its serving eNodeB on the Physical Random Access Channel (PRACH) in the first step (Message 1). Upon reception in the eNodeB, the preamble should thus be detected with high accuracy, such that the eNodeB may perform the following step in the contention-based random access procedure.

The emerging 5G technologies are characterized with many new features, such as much higher carrier frequencies and an increased number of antenna elements. As such, some new demands have to be considered while designing random access preambles for the 5G communication system, for example, reducing phase noise and frequency error for the higher carrier frequency and reducing the hardware complexity with multiple antennas.

SUMMARY

One or more method and apparatus embodiments according to the present disclosure aim to provide one or more solutions for transmitting and receiving random access preambles.

According to the first aspect of the present disclosure, there is provided a method for operating a terminal device, which transmits a random access preamble in a transmitting sub-frame. The sub-frame comprises a number of OFDM, Orthogonal Frequency-Division Multiplexing, symbols in a time domain. The method comprises: creating a sequence such that it comprises a plurality of random access sequences; dividing the plurality of random access sequences into a number $N_c$ of groups, each of groups including two or more random access sequences; performing code division multiplexing with respect to the groups of the plurality of random access sequences in a frequency domain, based on an orthogonal cover code selected for the terminal device from a pre-defined code set; and transforming signals after the code division multiplexing into the time domain to generate a random access preamble for the terminal device.

According to one or more embodiments of the first aspect of the present disclosure, the plurality of random access sequences of the random access preamble is a plurality of identical random access sequences.

According to the second aspect of the present disclosure, there is provided a method for operating a network device, which receives one or more random access preambles in a receiving sub-frame. The sub-frame comprises a number of OFDM symbols in a time domain. The method comprises: receiving a sub-frame possibly carrying one or more random access preambles used by one or more terminal devices respectively, wherein each random access preamble comprises a plurality of code division multiplexed random access sequences; dividing OFDM symbols of the received sub-frame into a number $N_c$ of groups, each of groups including two or more OFDM symbols; processing the OFDM symbols within each of the groups to obtain a number $N_c$ of code division multiplexed frequency domain vectors from the number $N_c$ of groups; performing code division de-multiplexing with respect to the number $N_c$ of code division multiplexed frequency domain vectors in the frequency domain based on a pre-defined code set; and detecting the one or more random access preambles based on signals after the code division de-multiplexing.

According to one or more embodiments of the second aspect of the present disclosure, each of the detected one or more random access preambles comprises a plurality of identical random access sequences.

According to the third aspect of the present disclosure, there is provided a terminal device. The terminal device is configured to transmit a random access preamble in a transmitting sub-frame, which comprises a number of OFDM symbols in a time domain. The terminal device comprises: a sequence creating unit configured to create a sequence such that it comprises a plurality of random access sequences; a grouping unit configured to divide the plurality of random access sequences into a number $N_c$ of groups, each of groups including two or more random access sequences; a code division multiplexing unit configured to perform code division multiplexing with respect to the groups of the plurality of random access sequences in a frequency domain, based on an orthogonal cover code selected for the terminal device from a pre-defined code set; and a transforming unit configured to transform signals after the code division multiplexing into the time domain to generate a random access preamble for the terminal device.

According to the fourth aspect of the present disclosure, there is provided a network device. The network device is configured to receive one or more random access preambles in a receiving sub-frame, which comprises a number of OFDM symbols in a time domain. The network device further comprises: a receiving unit configured to receive a sub-frame possibly carrying one or more random access preambles used by one or more terminal devices respectively, wherein each random access preamble comprises a plurality of code division multiplexed random access sequences; a grouping unit configured to divide OFDM symbols of the received sub-frame into a number $N_c$ of groups, each of groups including two or more OFDM symbols; an OFDM processing unit configured to process the OFDM symbols within each of the groups to obtain a number $N_c$ of code division multiplexed frequency domain vectors from the number $N_c$ of groups; a code division de-multiplexing unit configured to perform code division de-multiplexing with respect to the number $N_c$ of code division multiplexed frequency domain vectors in the frequency domain based on a pre-defined code set; and a detecting unit configured to detect the one or more random access preambles based on signals after the code division de-multiplexing.

According to the fifth aspect of the present disclosure, there provides a terminal device. The terminal device is configured to transmit a random access preamble in a transmitting sub-frame, which comprises a number of OFDM symbols in a time domain. According to an embodiment of the present disclosure, the terminal device comprises a processing means adapted to cause to create a sequence such that it comprises a plurality of random access sequences; cause to divide the plurality of random access sequences into a number $N_c$ of groups, each of groups including two or more random access sequences; cause to perform code division multiplexing with respect to the groups of the plurality of random access sequences in a frequency domain, based on an orthogonal cover code selected for the terminal device from a pre-defined code set; and cause to transform signals after the code division multiplexing into the time domain to generate a random access preamble for the terminal device. According to an embodiment of the present disclosure, the processing means may comprise a processor and a memory and the memory may contain instructions executable by the processor.

According to the sixth aspect of the present disclosure, there provides a network device. The network device is configured to receive one or more random access preambles in a receiving sub-frame, which comprises a number of OFDM symbols in a time domain. According to an embodiment of the present disclosure, the network device comprises a processing means adapted to cause to cause to receive a sub-frame possibly carrying one or more random access preambles used by one or mere terminal devices respectively, wherein each random access preamble comprises a plurality of code division multiplexed random access sequences; cause to divide OFDM symbols of the received sub-frame into a number $N_c$ of groups, each of groups including two or more OFDM symbols; cause to process the OFDM symbols within each of the groups to obtain a number $N_c$ of code division multiplexed frequency domain vectors from the number $N_c$ of groups; cause to perform code division de-multiplexing with respect to the number $N_c$ of code division multiplexed frequency domain vectors in the frequency domain based on a pre-defined code set; and cause to detect the one or more random access preambles based on signals after the code division de-multiplexing. According to an embodiment of the present disclosure, the processing means may comprise a processor and a memory and the memory may contain instructions executable by the processor.

According to one or more embodiments of the present disclosure, an orthogonal cover code is selected for the UE to perform code division multiplexing with respect to the grouped random access sequences of the preamble in a frequency domain. In this way, the random access collision probability would be decreased due to the extension of code domain, such that the random access capacity can be well improved without much loss on the performance.

BRIEF DESCRIPTION OF THE DRAWINGS

Inventive features regarded as the characteristics of the present invention are set forth in the appended claims. However, the present invention, its implementation mode, other objectives, features and advantages will be better understood through reading the following detailed description on the exemplary embodiments with reference to the accompanying drawings, where in the drawings:

DETAILED DESCRIPTION

Hereinafter, embodiments of the present disclosure will be described with reference to the accompanying drawings. In the following description, many specific details are illustrated so as to understand the present disclosure more comprehensively. However, it is apparent to the skilled in the art that implementation of the present invention may not have these details. Additionally, it should be understood that the present invention is not limited to the particular embodiments as introduced here. On the contrary, any combination of the following features and elements may be considered to implement, and practice the present invention, regardless of whether they involve different embodiments. For example, while it is described below in the context of 5G cellular communication system for illustrative purposes, those skilled in the art will recognize that one or more embodiments of the present disclosure can also be applied to various other types of cellular communication systems. Thus, the following aspects, features, embodiments and advantages are only for illustrative purposes, and should not be understood as elements or limitations of the appended claims, unless otherwise explicitly specified in the claims.

Figure 1:
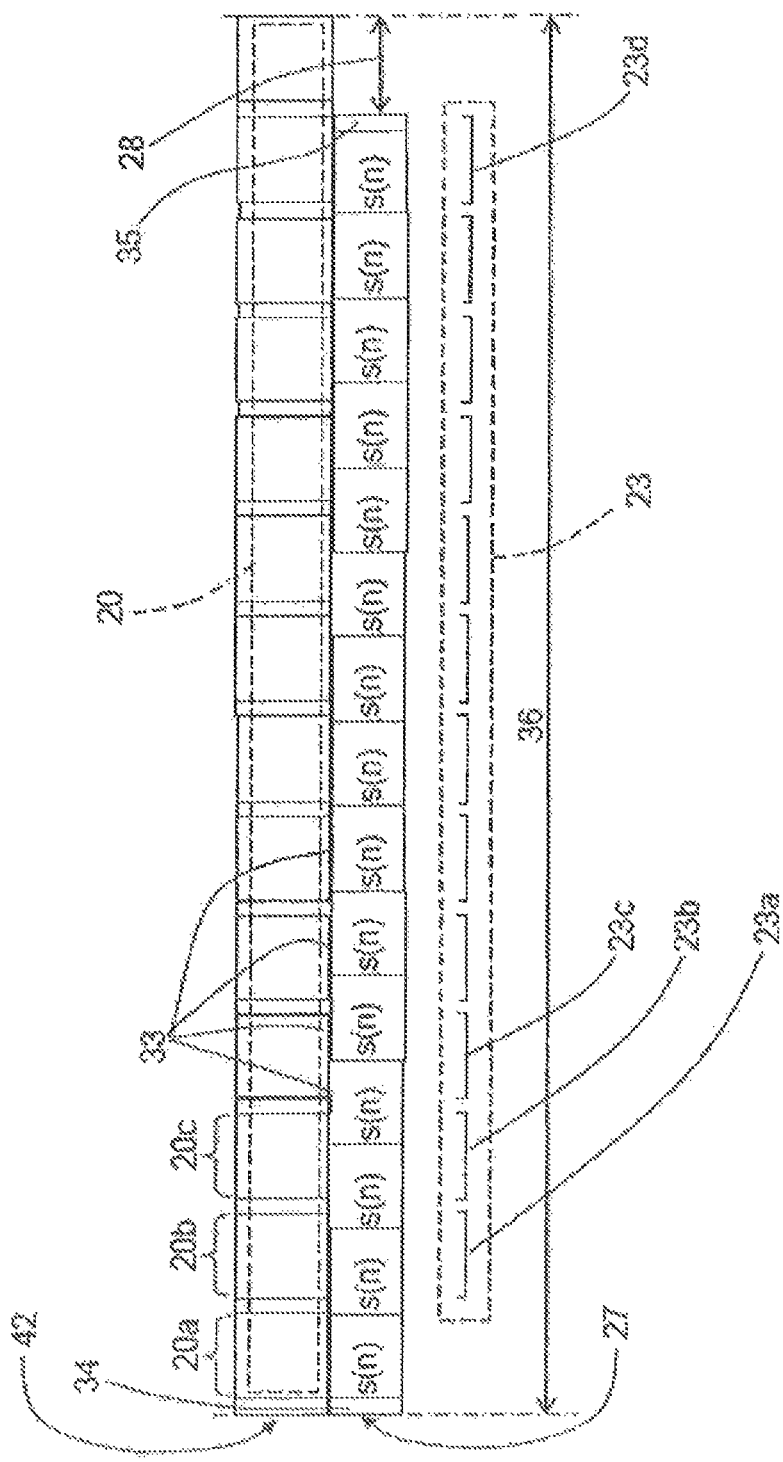
FIG. 1 is a diagram schematically illustrating a random access preamble format, based on which various embodiments of the present disclosure can be implemented.

To suppress phase noise and frequency error for the higher carrier frequency and reduce the complexity of the hardware with massive antenna array, an enhanced PRACH preamble format was proposed for 5G cellular communication systems according to PCT application No. PCT/EP2014/055898, which was filed by the same applicant and has not been published yet until the filing date of the present application. FIG. 1 is a diagram schematically illustrating the random access preamble format proposed in the above-mentioned prior application. With reference to FIG. 1 showing one sub-frame 36 at a UE with a Physical Uplink Shared Channel (PUSCH) 42, for each UE, the proposed enhanced random access preamble 27 is designed such that it comprises a sequence of a plurality of short random access sequences S(n) 33 (only a few indicated in FIG. 1). Each random access sequence S(n) may be designed to have the same length in the time domain as each OFDM symbol 20a, 20b, 20c (only a few indicated in FIG. 1), that is used for all other physical channels, such as user and control data, and reference signals. The corresponding preamble detector at the receiver side is configured with a number of FFT processing windows 23a, 23b, 23c, 23d (only a few indicated in FIG. 1) to collect received signals to be used in FFT processing. Each of the FFT processing windows 23 has the same size as time domain representation (samples) of the short random access sequence (S(n)) 33. If the short random access sequence 33 is designed to have the same length in the time domain as each one of the OFDM symbols 20a, 20b, 20c, the size of the FFT processing window 23a, 23b, 23c, 23d used in the detector at the receiver side can be same as those for other uplink channels and signals. In this way, the amount of special random-access related processing and hardware support is significantly reduced for multi-antenna systems, and the detector is also robust against inter-carrier interference from other uplink channels and signals. Furthermore, the proposed preamble detector scheme can be used in scenarios with a high amount of phase noise and frequency errors. The entire disclosure of PCT application No. PCT/EP2014/055898 is incorporated herein by reference.

However, because of the short random access sequence (S(n)) 33 having no cyclic prefix (CP), the number of orthogonal sequences constructed from cyclic shifts would be very small even within a very small coverage. In theory, the length of cyclic shift value to keep zero correlation of ZC sequence can be obtained by $$N_{cs} \geq \left[\left(\frac{20}{3}r + \tau_{ds}\right)\frac{N_{ZC}}{T_{SEQ}}\right] + n_g, \qquad 1)$$

where r is the expected cell size (km), $\tau_{ds}$ is the maximum delay spread, $N_{ZC}$ and $T_{SEQ}$ are the sequence length and duration respectively, and $n_g$ is the number of additional guard samples due to the receiver pulse shaping filter.

In a simulation environment using the preamble settings $N_{ZC}$=71, $T_{SEQ}$=13.3us, and assuming $n_g$=0, the number of available orthogonal sequences with different cyclic shifts can be obtained based on equation 1), where different maximum delay spreads are considered.

The simulation results show that in a cell with radius larger than 1 km only one sequence, i.e., no cyclic shifting, can be supported. If the cell is about 500 m, about 3 orthogonal sequences can be supported, which is much smaller than those in LTE, i.e., 64.

Thus, the inventor noted that such enhanced design of random access preambles can only provide the very small number of orthogonal preamble sequences, which may significantly increase the access collision, probability and thus decrease the access capacity.

In general, more physical resources, such as resource blocks, sub-frames and beams can be reserved for transmission of the random access preamble in PRACH to improve capacity. However, when deploying a very high flexible downlink and uplink assignment of sub-frames in each frame, the system could have a small number of uplink sub-frames for PRACH transmission.

In addition, if a large number of antennas are deployed on eNodeB side (e.g., massive MIMO in 5G), the receiving beamforming needs to be implemented to improve the receiving performance. In order to measure the random access request in the limited number of uplink PRACH sub-frames as much as possible, the wide beam would be used. Therefore, the access collision possibility with wide beam is much higher than that with narrow beam.

In summary, based on the design of PRACH preamble with the very small number of available orthogonal preamble sequences, the small number of uplink sub-frames for PRACH and wide-beam receiving would much limit the access capacity due to the high collision possibility.

In order to solve at least one of the existing problems as described above, one or more embodiments of the present disclosure intents to provide one or more novel and inventive solutions of generating and detecting random access preambles.

In the present disclosure, terminal devices also known as mobile terminals, wireless terminals and/or User Equipment (UE) are enabled to communicate wirelessly with a network node in a wireless communication system, sometimes also referred to as a cellular radio system. For instance, a terminal device may be, but is not limited to: mobile phone, smart phone, sensor device, meter, vehicle, household appliance, medical appliance, media player, camera, or any type of consumer electronic, for instance, but not limited to, television, radio, lighting arrangement, tablet computer, laptop, or PC. The communication device may be a portable, pocket-storable, hand-held, computer-comprised, or vehicle-mounted mobile device, enabled to communicate voice and/or data, via a wireless or wireline connection.

Typically, a network device may serve or cover one or several cells of the wireless communication system. That is, the network node device provides radio coverage in the cell(s) and communicates over an air interface with communication devices operating on radio frequencies within its range. The network device in some wireless communication systems may be also referred to as "base station (BS)", "eNB", "eNodeB", "NodeB" or "B node", depending on the technology and terminology used. In the present disclosure, the network device may also be referred to as an eNodeB. The network node devices may be of different classes such as e.g. macro eNodeB, home eNodeB or pico base station, or relay node, based on transmission power and thereby also cell size.

With reference to FIGS. 2-7, various embodiments of the present disclosure are described in detail.

Figure 2:
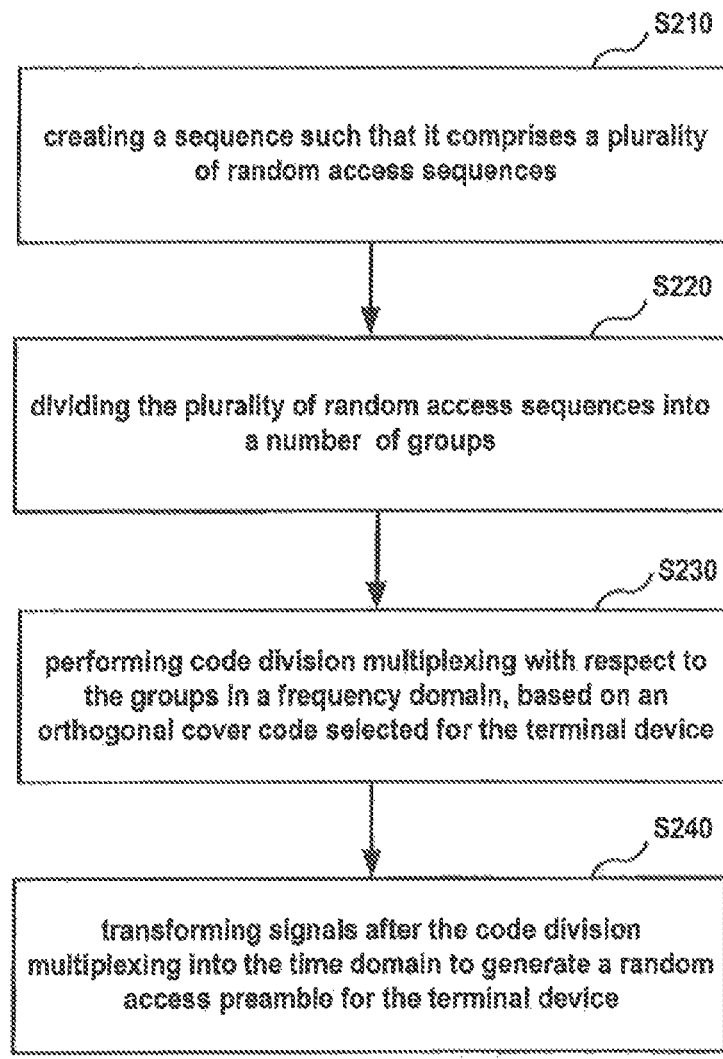
FIG. 2 is a diagram schematically illustrating an exemplary flow chart of a method for operating a terminal device according to one or more embodiments of the present disclosure.

FIG. 2 is a diagram schematically illustrating an exemplary flow chart of a method 200 for operating a terminal device according to one or more embodiments of the present disclosure. During the random access procedure, the terminal device is configured to transmit a random access preamble in a transmitting sub-frame.

As shown in FIG. 2, in step S210, a sequence is created such that it comprises a plurality of random access sequences.

According to one or more embodiments of the present disclosure, the plurality of random access sequences of the random access preamble may be a plurality of identical random access sequences. each identical random access sequence may be generated based on Zadoff-Chu root sequence as follows:

$$s_u(n) = \exp\left[-j2\pi u \frac{\frac{n(n+1)}{2}}{N_{ZC}}\right], n = \{0, \ldots, N_{ZC} - 1\}, \qquad 2)$$

where u denotes the cyclic shift value, $N_{ZC}$ is the length of root sequence. Before being mapped to the subcarriers, this time domain sequences $s_u(n)$ needs to be processed by a Discrete Fourier Transfer (DFT) module resulting in a frequency domain vector $S_u$.

According to one or more embodiments of the present disclosure, each random access sequence may correspond to each of the OFDM symbols and has the same length as each one of the OFDM symbols. Those skilled in the art may appreciate that the one-to-one correspondence between OFDM symbols and the plurality of short random access sequences may not be necessary for the various embodiments of the present disclosure. In some other embodiments, each random access sequence may also correspond to a fixed number of the OFDM symbols, i.e., using more than one OFDM symbols to carry each short random access sequence. Such configuration may be predetermined for a specific system and both terminal and network sides should be aware of it.

In step S220, the plurality of random access sequences $s_u(n)$ are divided into a number $N_c$ of groups, each of groups including two or more random access sequences.

In fact, the grouped random access sequences can be obtained by using any suitable, pre-defined grouping manner, which will not constitute a restriction factor on the solutions of the present disclosure. For the purpose of simplicity, here is described an example where each random access sequence corresponds each one OFDM symbol. According to the example, the plurality of random access sequences may be divided into $N_c$ groups, such that the size of the first $N_c-1$ groups is $N_{g_k}=\lfloor N_s/N_c \rfloor$, $k=\{0, \ldots, N_c-2\}$, and the size of the last group is $$N_{g_{N_c-1}} = \lfloor N_s/N_c \rfloor + \mathrm{mod}(N_s, N_c),$$

wherein $N_s$ denotes the number of OFDM symbols in the sub-frame; $\lfloor x \rfloor$ denotes a floor function that rounds x to the nearest integer less than or equal to x; mod(x, y) denotes a modulo function that obtains the remainder after x is divided by y.

In Step S230, code division multiplexing is performed with respect to the groups of the plurality of random access sequences in a frequency domain, based on an orthogonal cover code selected for the terminal device from a pre-defined code set. According to one or more embodiments of the present disclosure, the orthogonal cover codes of the pre-defined code set have a length of $N_c$, which is the same as the number of the divided groups of the random access sequences. The number $N_c$ of the groups may be informed from a network device to the terminal device via PRACH configuration.

According to one or more embodiments of the present invention, for a frequency domain vector of the $n_s^{th}$ random access sequence in the $n_g^{th}$ group, the code division multiplexing may be performed by multiplying the frequency domain vector of the $n_s^{th}$ random access sequence with the $n_g^{th}$ element of the orthogonal cover code.

In some embodiments where the network device such as eNodeB performs a blind detection for the random access preamble, the orthogonal cover code used to perform the code division multiplexing in step S230 may be randomly selected by the terminal device. In some other embodiments, the eNodeB may select a specific orthogonal cover code for the terminal device from the pre-defined code set and inform the terminal device of the same via PRACH configuration signaling.

In step S240, signals after the code division multiplexing are transformed into the time domain to generate a random access preamble for the terminal device.

As described above with reference to FIG. 2, on the terminal device side, the created multiple random access sequences are divided into several groups. Then, code division multiplexing can be performed with respect to the divided groups based on an orthogonal cover code selected for the terminal device from the pre-defined code set. Due to the introduction of code division multiplexing into the random access preamble generation, the random access capacity can be improved.

Figure 3:
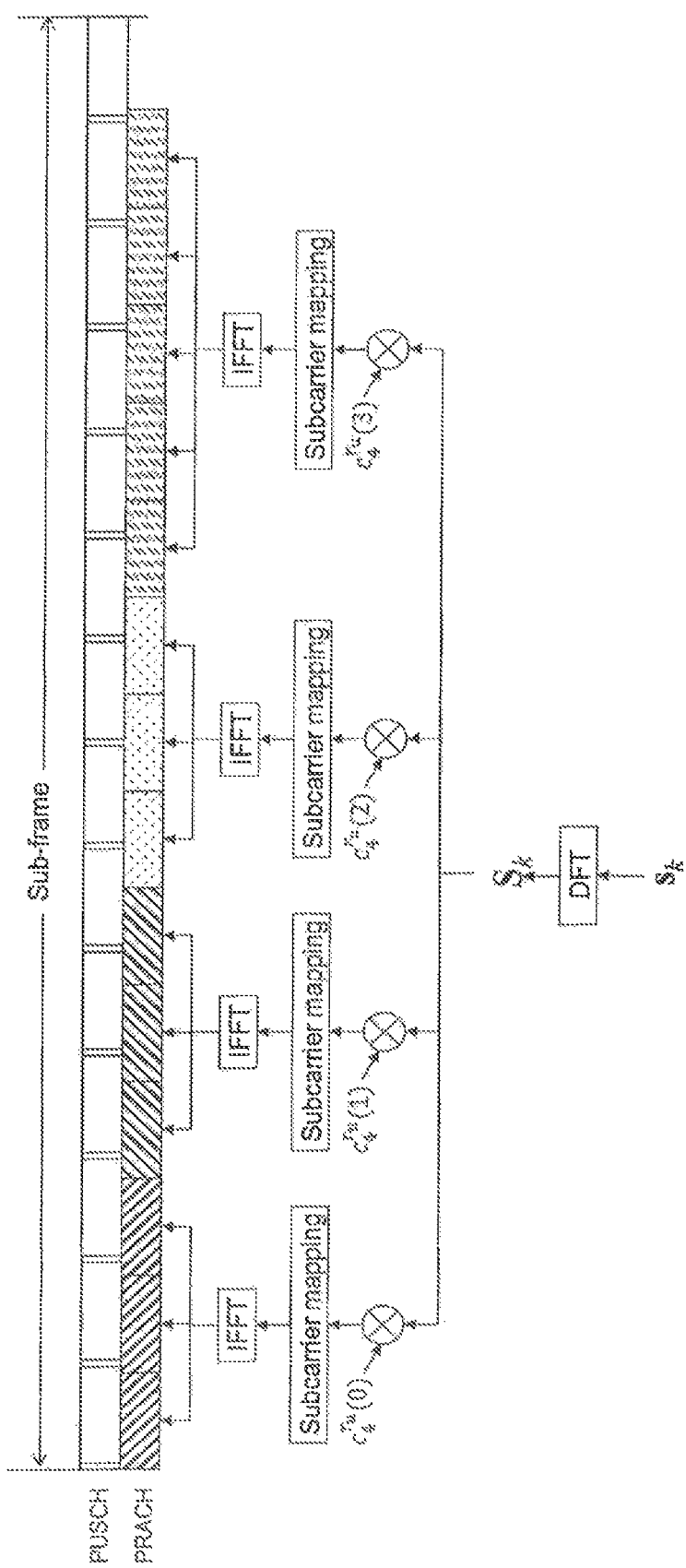
FIG. 3 is a diagram schematically illustrating a specific example according to the one or more embodiments as shown in FIG. 2.

FIG. 3 is a diagram schematically illustrating a specific example according to the one or more embodiments an shown in FIG. 2.

As shown in FIG. 3, the identical random access sequences contained in the created sequence may be denoted as a time domain vector $s_u$. Before being mapped to the subcarriers, this time domain vector $s_u$ may be processed by a Discrete Fourier Transfer (DFT) operations (illustrated by a "DFT" block in FIG. 3) resulting in a corresponding frequency domain vector denoted as $S_u$.

In this example, each random access sequence corresponds to each of the OFDM symbols in the sub-frame and has the same length as each one of the OFDM symbols. Assume there are 14 OFDM symbols (i.e., $N_s=14$) to carry the random access preamble with 14 random access sequences in a PRACH sub-frame. Before being mapped to the dedicated subcarriers in each OFDM symbols (illustrated by "subcarrier mapping" blocks in FIG. 3), code division multiplexing is performed with respect to the grouped frequency domain vectors $S_u$.

The 14 random access sequences (i.e., $N_s=14$ in this example) are divided into 4 groups, i.e., $N_c=4$. In FIG. 3, different four groups of random access sequences are illustrated by different types of shading in the PRACH 27.

An orthogonal cover code (OCC) set with length of 4 can be pre-defined so as to satisfy the number 4 of divided groups. For example, Walsh codes $C_4$ with length of 4 may be used as the pre-defined code set:

$$C_4 = \begin{bmatrix} 1 & 1 & 1 & 1 \\ 1 & -1 & 1 & -1 \\ 1 & 1 & -1 & -1 \\ 1 & -1 & -1 & 1 \end{bmatrix} \quad 3)$$

More generally, the $r^{th}$ row in the matrix $C_{N_c}$ is selected as an OCC code, denoted as $$c_{N_c}^{(r)}[c_{N_c}^{(r)}(0) \ldots c_{N_c}^{(r)}(N_c-1)] \quad 4)$$

Specifically, in FIG. 3, the code division multiplexing step is illustrated by the multipliers. The frequency domain vector of the random access sequence to be mapped on the $n_s^{th}$ OFDM symbol, $n_s=\{0, \ldots, N_s-1\}$, which belongs to the $n_g^{th}$ group, is multiplied by the $n_g^{th}$ element of the selected orthogonal cover code, e.g., the element $r_u^{th}(n_g)$ of $r_u^{th}$ row. As illustrated by "Multipliers" in FIG. 3, this operation may be expressed by $$S_u^{(n_s)} = S_u c_{N_c}^{(r_u)}(n_g) \quad 5)$$

After being mapped to a certain subcarrier as illustrated by "Subcarrier Mapping" blocks, the signals are transformed into the time domain by performing inverse Fast Fourier Transform (IFFT) (as illustrated by "IFFT" blocks in FIG. 3) so as to generate the random access preamble to be transmitted by RF modules of the terminal device.

To facilitate the implementation, the number of groups $N_c=4$ needs to be available for both the network and terminal devices. According to an embodiment, the network device may inform UE of the parameter $N_c$ via PRACH configuration. In the embodiments that support Walsh codes, the candidate $N_c$ values may be only 1, 2 and 4, thus the signaling overhead will be very small. On the other hand, if the larger number $N_c$ of groups is used, the larger capacity can be achieved, since more preambles can be code-division multiplexed with the same cyclic shift value. However, the larger number also means less coherent accumulation gains at the preamble detecting procedure. Thus, the network device may configure larger group number $N_c$, if there are more access loads, otherwise the smaller one can be configured, taking the trade-off between coherent accumulation gain and load into account.

Figure 4:
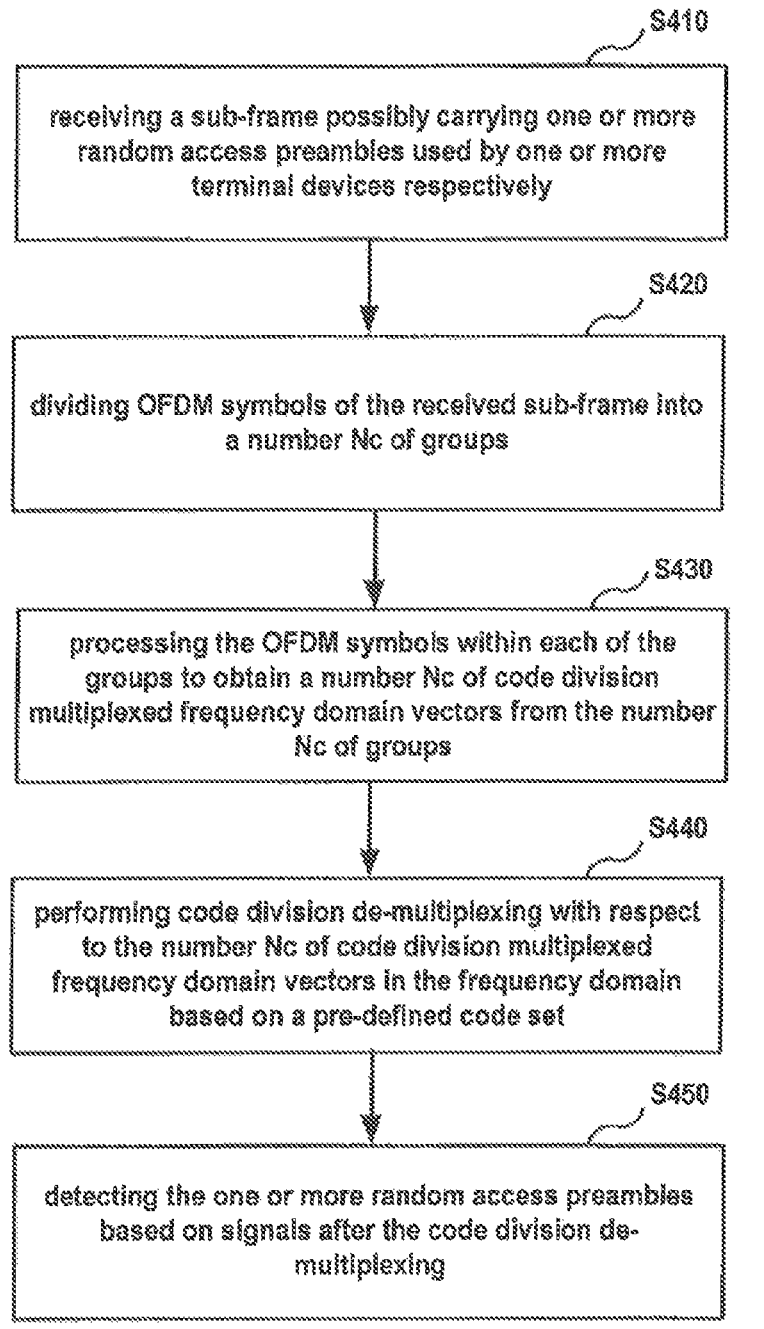
FIG. 4 is a diagram schematically illustrating an exemplary flow chart of a method for operating a network device according to one or more embodiments of the present disclosure.

FIG. 4 is a diagram schematically illustrating an exemplary flow chart of a method 400 for operating a network device according to one or more embodiments of the present disclosure. The network device is configured to receive one or more random access preambles from corresponding terminal devices in a receiving sub-frame, so as to response to the terminal devices' access request.

As shown in FIG. 4, in step S410, the network device receives a sub-frame possibly carrying one or more random access preambles used by one or more terminal devices respectively. The sub-frame comprises a number of OFDM, symbols in a time domain and each random access preamble, if available in the sub-frame, comprises a plurality of code division multiplexed random access sequences.

According to one or more embodiments, each multiplexed random access sequence may correspond to each of the OFDM symbols and has the came length as each one of the OFDM symbols. However, the one-to-one correspondence between OFDM symbols and the plurality of short random access sequences may not be necessary for the various embodiments of the present disclosure. In some other embodiments, each random access sequence may also correspond to a fixed number of the OFDM symbols, i.e., using more than one OFDM symbols to carry each short random access sequence of the preamble. Such configuration may be predetermined for a specific system and both terminal and network sides should be aware of it.

In step S420, in order to detect the random access preamble, OFDM symbols of the received sub-frame are divided into a number $N_c$ of groups, each of which includes two or more OFDM symbols. The network device needs to adopt the same grouping manner as the corresponding terminal devices.

In fact, the grouped random access sequences can be obtained by using any suitable, pre-defined grouping manner, which will not constitute a restriction factor on the solutions of the present disclosure. In the case that each random access sequence corresponds each one OFDM symbol, the OFDM symbols may be divided such that the size of the first $N_c-1$ groups is $N_{g_k}=\lfloor N_s/N_c \rfloor$, $k=\{0, \ldots, N_c-2\}$, and the size of the last group is $$N_{g_{N_c-1}} = \lfloor N_s/N_c \rfloor + \mathrm{mod}(N_s, N_c),$$

wherein $N_s$ denotes the number of OFDM symbols in the sub-frame, $\lfloor x \rfloor$ denotes a floor function that rounds x to the nearest integer less than or equal to x; mod(x, y) denotes a modulo function that obtains the remainder after x is divided by y.

In step S430, the OFDM symbols within each of the groups are processed to obtain a number $N_c$ of code division multiplexed frequency domain vectors from the number $N_c$ of groups.

When generating the random access preamble on the transmitting side, each group is multiplied with a corresponding element of the selected orthogonal cover code. That means, at the receiving side, the network device will receive multiple same code division multiplexed short sequences within one group. Coherent combination within each group may help to achieve coherent accumulation gains. According to ono oar more embodiments of the present disclosure, for each of the number $N_c$ of the groups, Fast Fourier Transform (FFT) and Match Filtering (MF) are performed on each of at least two contiguous OFDM symbols within the group. In the embodiments where one short, random access sequence of the preamble are mapped to more, than one OFDM symbol, example 2 OFDM symbols, the processing window should choose 2 OFDM symbols. That is, FFI and MF may be performed based on at least two contiguous processing window, each contains 2 OFDM symbols. Then, the resulted signals within the group are coherently combined to obtain the corresponding code division multiplexed frequency domain vector.

In step S440, code division de-multiplexing is performed with respect to the number $N_c$ of code division multiplexed frequency domain vectors in the frequency domain based on a pre-defined code set. According to embodiments of the present disclosure, orthogonal cover codes of the pre-defined code set may have a length of $N_c$, which is the same as the number of the divided groups. The network device may pre-define the number $N_c$ of the groups and inform the terminal device in PRACH configuration.

Depending on whether the selected orthogonal cover code used to perform code division multiplexing is randomly selected by the terminal device or assigned by the network node, the network device may adopt different de-multiplexing approaches.

In the case that the orthogonal cover code is randomly selected by the terminal, the network device has to perform de-multiplexing in a blindly detecting mode, as it does not know which orthogonal cover code can be used to de-multiplex the received preamble. According to one or more embodiments of the present disclosure, for a code division multiplexed frequency domain vector of the $n_s^{th}$ OFDM symbol in the $n_g^{th}$ group, the code division multiplexed frequency domain vector of the $n_s^{th}$ OFDM symbol is multiplied with the $n_g^{th}$ element of each orthogonal cover code of the pre-defined code set.

In the case that the orthogonal cover code is assigned to the terminal device by the network device, the network device may only use those orthogonal cover codes having been assigned to the terminal devices, rather than all the cedes in the pre-defined code set. According to one or more embodiments, for a code division multiplexed frequency domain vector of the $n_s^{th}$ OFDM symbol in the $n_g^{th}$ group, the code division multiplexed frequency domain vector of the $n_s^{th}$ OFDM symbol with the $n_g^{th}$ element of each of one or more orthogonal cover codes that are assigned to the one or more terminal devices from the pre-defined code set respectively.

In step S450, the one or more random access preambles are detected based on signals after the code division de-multiplexing. If a terminal device uses the same orthogonal cover codes on the same preamble with the same cyclic shift from the root sequence, the burst can be detected. The existence of preambles with corresponding orthogonal cover codes can be measured and identified based on some pre-defined threshold. According to one or more embodiments, each of the detected one or more random access preambles comprises a plurality of identical random access sequences.

Figure 5:
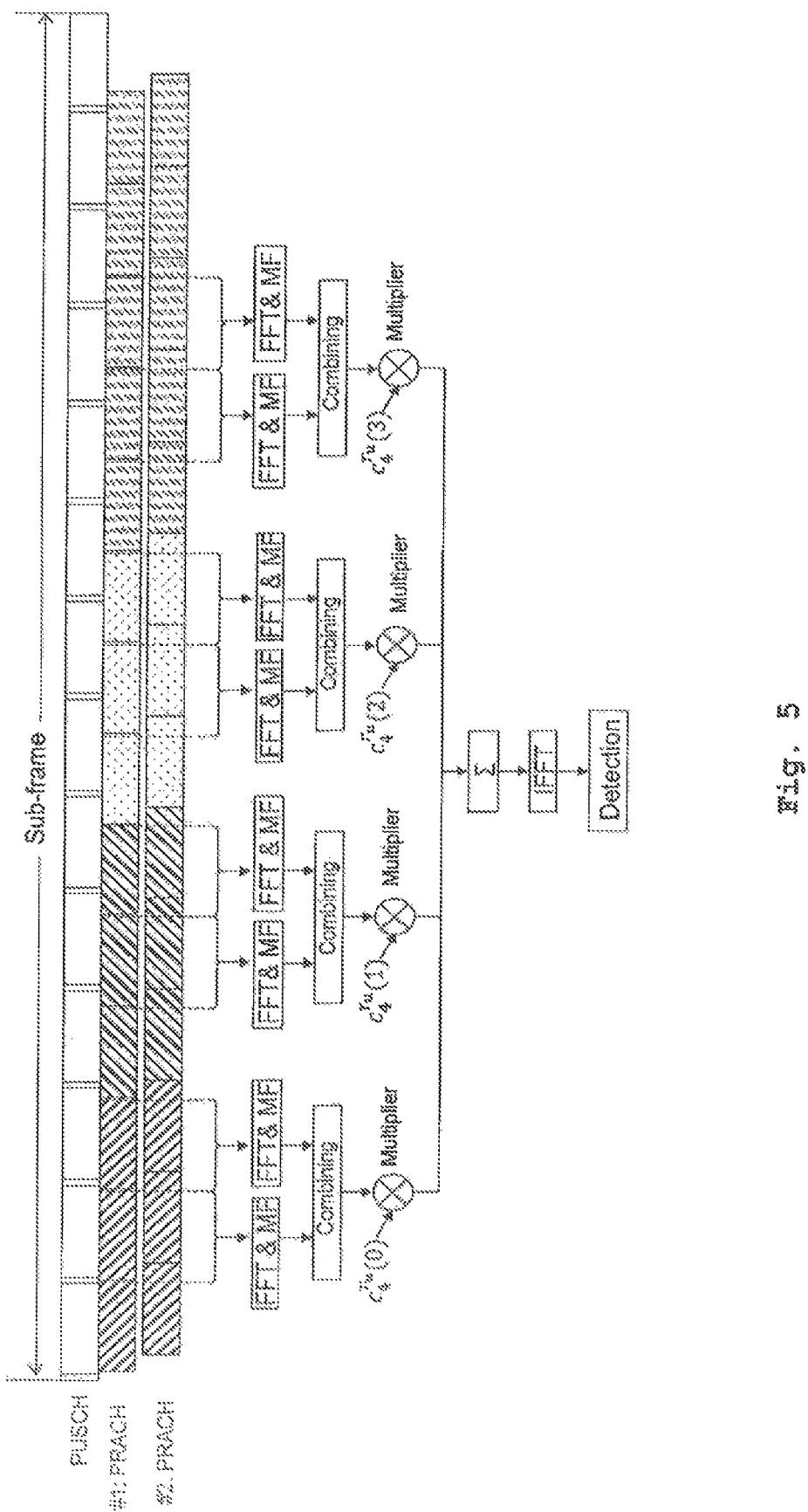
FIG. 5 is a diagram schematically illustrating a specific example according to the one or more embodiments as shown in FIG. 4.

FIG. 5 is a diagram schematically illustrating a specific example according to the one or more embodiments as shown in FIG. 4.

In the PRACH sub-frames, the network device would detect the preamble to check whether there is random access request or not. As shown in FIG. 5, there are two random access preambles from different terminal devices 1, 2 carried in a receiving sub-frame. According to the various embodiments of the present disclosure, those two preambles are code division multiplexed by different orthogonal cover codes selected for the terminal devices 1, 2 from the pre-defined code set and therefore, can be detected by the network device.

It may be assumed that the maximum propagation delay between the terminal devices 1, 2 and the network device is less than the OFDM symbol duration. Then, the network device would start to process the sub-frame possibly carried the PRACH preambles after one OFDM symbol with cyclic prefix (CP).

According to the group number $N_c$ value, which may be informed in the PRACH configuration, the $N_c$ groups of FFT and MF operations (illustrated by "FFT&MF" blocks in FIG. 5) are performed to detect the code division multiplexed random access sequences of the preamble in each group. The resulted signals are in turn coherently combined within each group (as illustrated by "Combining" blocks in FIG. 5).

In the example of FIG. 5, the group number $N_c$ is set to 4 and each group contains at least three OFDM symbols for a 14-OFDM-symbol sub-frame. Therefore, FFT and MF operations may be performed with respect to two contiguous OFDM symbols within one group, so as to avoid the overlap between two continuous groups from different terminal devices. The two continuous values after FFT and MF operations are coherently combined in each group. Similarly, if the group number $N_c$ is set to 2, then FFT and MF operations may be performed with respect to six contiguous OFDM symbols within one group before the coherent combination. According to one or more embodiments of the present disclosure, at least one OFDM symbol may be reserved to avoid the overlap between continuous groups from different terminal devices. It should be appreciated that according to the present disclosure, the signal segmentation (group division) may be based on the PRACH allocation, i.e., OFDM symbols without CP, which is different with the traditional uplink shared channel.

After coherent combination in each group (as illustrated by the "Combining" blocks, the $N_c$ values from all groups need to be de-multiplexed based on the pre-defined code set. As explained, with respect to FIGS. 2 and 3, to improve the random access capacity, the orthogonal cover code is selected from the pre-defined code set to avoid the collision among the terminal devices.

The code division de-multiplexing step is illustrated by the number $N_c$ of multipliers, i.e., $N_c$=4. No matter in blindly detecting or detecting based on the assigned orthogonal cover code, for each group, the network device may multiply the signal resulted from coherent combination by corresponding elements of the candidate orthogonal cover codes in the frequency domain.

In the example as shown in FIG. 5, 4 values can be obtained and then accumulated at the "Σ" block so as to perform subsequent IFFT and detection operations (as illustrated by "IFFT" and "Detection" blocks). According to some pre-defined threshold, the existence of preambles with orthogonal cover codes can be measured and identified.

Therefore, with code division multiplexing based on orthogonal cover codes, the random access capacity could be at most $N_c$ times than the scheme without code division multiplexing.

Figure 6:
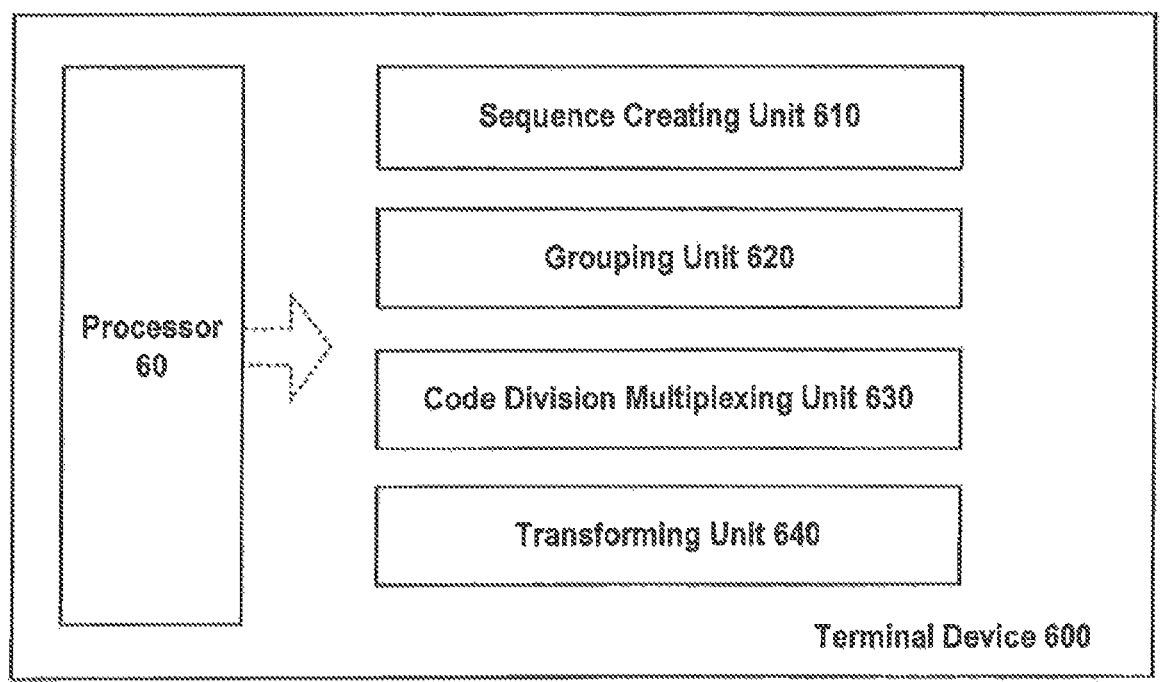
FIG. 6 is a block diagram schematically illustrating a terminal device according to one or more embodiments of the present disclosure.

FIG. 6 is a block diagram schematically illustrating a network node device 600 according to one or more embodiments of the present disclosure.

As shown in FIG. 6, the terminal device 600 is configured to transmit to its serving network device such as eNodeB a random access preamble in a transmitting sub-frame when initiating a random access procedure. The sub-frame includes a number of OFDM symbols in a time domain. The terminal device 600 comprises a sequence creating unit 610, a grouping unit 620, a code division multiplexing unit 630 and a transforming unit 640. The terminal device 600 may also comprise a suitable radio frequency transceiver for wireless communications with one or more network devices via multiple antennas (not shown in FIG. 6).

The terminal device 600 may comprise a processor 60, which includes one or more microprocessor or microcontrollers, as well as other digital hardware, which may include digital signal processors (DSPs), special-purpose digital logic, and the like. The processor 60 may be configured to execute program code stored in memory (not shown in FIG. 6), which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processor 60 may be used to cause the sequence creating unit 610, the grouping unit 620, the code division multiplexing unit 630 and the transforming unit 640 to perform corresponding functions according one or more embodiments of the present disclosure.

The sequence creating unit 610 is configured to create a sequence such that it comprises a plurality of random access sequences. According to one or more embodiments, the plurality of random access sequences of the random access preamble created by the sequence creating unit 610 may a plurality of identical random access sequences. And in some embodiments, each random access sequence may correspond to each of the OFDM symbols and has the same length as each one of the OFDM symbols.

The grouping unit 620 is configured to divide the plurality of random access sequences into a number $N_c$ of groups, each of groups including two or more random access sequences. According to one or more embodiments of the present invention, the grouping unit 620 may be configured to divide the plurality of identical random access sequences such that the size of the first $N_c-1$ groups is $N_{g_k}=\lfloor N_s/N_c \rfloor$, $k=\{0, \ldots, N_c-2\}$, and the size of the last group is $$N_{g_{N_c-1}} = \lfloor N_s/N_c \rfloor + \mathrm{mod}(N_s, N_c),$$

wherein $N_s$ denotes the number of OFDM symbols in the time domain; $\lfloor x \rfloor$ denotes a floor function that rounds x to the nearest integer less than or equal to x; mod(x, y) denotes a modulo function that obtains the remainder after x is divided by y.

With respect to the groups of plurality of random access sequences, the code division multiplexing unit 630 is configured to perform code division multiplexing in a frequency domain, based on an orthogonal cover code selected for the terminal device from a pre-defined code set. According to one or more embodiments of the present disclosure, the code division multiplexing unit 630 may be configured, for a frequency domain vector of the $n_s^{th}$ random access sequence in the $n_g^{th}$ group, to multiply the frequency domain vector of the $n_s^{th}$ random access sequence with the $n_g^{th}$ element of the orthogonal cover code. In some embodiments, the orthogonal cover code used by the code division multiplexing unit 630 may be randomly selected from the pre-defined code set. In some other embodiment, it may be informed from the network device to the terminal device 600 via PRACH configuration.

According to one or more embodiments of the present disclosure, the selected orthogonal cover code has a length of $N_c$, which is the same as the number of the groups divided by the grouping unit 620. The number $N_c$ of the groups may be informed from the network device to the terminal device 600 via PRACH configuration, such that the grouping unit 620 and the code division multiplexing unit 630 can operate accordingly.

After being mapped into a certain subcarrier, the signals resulted from the code division multiplexing unit 630 are in turn fed into the transforming unit 640 and transformed into the time domain, so as to generate a random access preamble for transmission.

Figure 7:
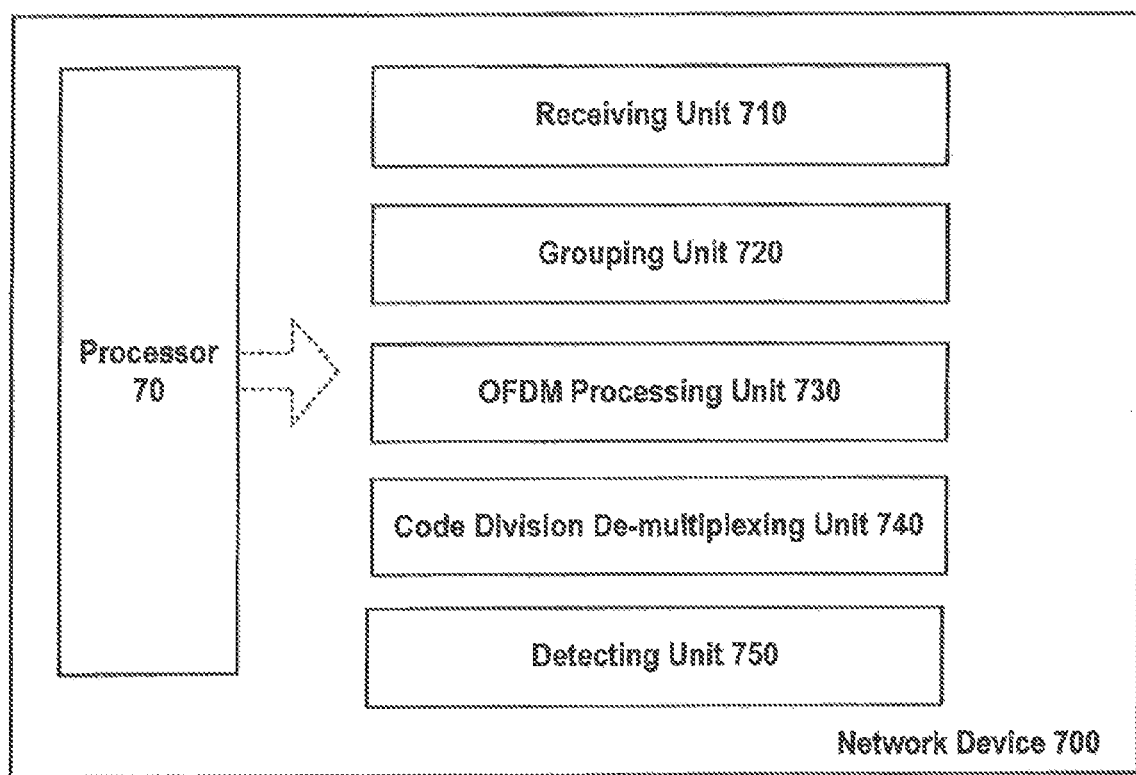
FIG. 7 is a block diagram schematically illustrating a network device according to one or more embodiments of the present disclosure.

FIG. 7 is a block diagram schematically illustrating a network device 700 according to one or more embodiments of the present disclosure.

As shown in FIG. 7, the network device 700, such as eNodeB, is configured to receive, from one or more terminal devices such as UEs, one or more random access preambles in a receiving sub-frame. The sub-frame includes a number of OFDM symbols in a time domain. The network device 700 comprises a receiving unit 710, a grouping unit 720, an OFDM processing unit 730, a code division de-multiplexing unit 740, a detecting unit 750. The network device 700 may comprise a suitable radio frequency transceiver for wireless communications with a network node device via one or more antennas (not shown in FIG. 7).

The network device 700 may comprise a processor 70, which includes one or more microprocessor or microcontrollers, as well as other digital hardware, which may include digital signal processors (DSPs), special-purpose digital logic, and the like. The processor 70 may be configured to execute program code stored in memory (not shown in FIG. 7), which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processor 70 may be used to cause the receiving unit 710, the grouping unit 720, the OFDM processing unit 730, the code division de-multiplexing unit 740, the detecting unit 750 to perform corresponding functions according one or more embodiments of the present disclosure.

The receiving unit 710 is configured to receive a sub-frame possibly carrying one or more random access preambles used by one or more terminal devices respectively. The received random access preamble comprises a plurality of code division multiplexed random access sequences. According to one or more embodiments of the present disclosure, each random access sequence of the random access preamble corresponds to each of the OFDM symbols of the sub-frame and has the same length as each one of the OFDM symbols.

The grouping unit 720 is configured to divide OFDM symbols of the received sub-frame into a number $N_c$ groups, each of groups including two or more OFDM symbols. The network device 700 may pre-define the number $N_c$ of the groups in PRACH configuration. According to one or more embodiments of the present disclosure, the grouping unit 720 may be configured to divide the OFDM symbols such that the size of the first $N_c-1$ groups is $N_{g_k}=\lfloor N_s/N_c \rfloor$, $k=\{0, \ldots, N_c-2\}$, and the size of the last group is $$N_{g_{N_c-1}} = \lfloor N_s/N_c \rfloor + \mathrm{mod}(N_s, N_c),$$

wherein $N_s$ denotes the number of OFDM symbols; $\lfloor x \rfloor$ denotes a floor function that rounds x to the nearest integer less than or equal to x; mod(x, y) denotes a modulo function that obtains the remainder after x is divided by y.

The OFDM processing unit 730 is configured to process the OFDM symbols within each of the groups to obtain a number $N_c$ of code division multiplexed frequency domain vectors from the number $N_c$ of groups. According to one or more embodiments of the present disclosure, the OFDM processing unit is configured, for each of the number $N_c$ of the groups, to perform FFT and MF on each of at least two contiguous OFDM symbols within the corresponding group and coherently combine signals resulted respectively from the at least two contiguous OFDM symbols.

The code division de-multiplexing unit 740 is configured to perform code division de-multiplexing with respect to the number $N_c$ of code division multiplexed frequency domain vectors in the frequency domain based on a pre-defined code set. In one or more embodiments of the present disclosure, orthogonal cover codes of the pre-defined code set has a length of $N_c$, which is the same as the number of.

According to one or more embodiments of the present disclosure, the code division de-multiplexing unit 740 may be configured, for a code division multiplexed frequency domain vector of the $n_s^{th}$ OFDM symbol in the $n_g^{th}$ group, to multiply the code division multiplexed frequency domain vector of the $n_s^{th}$ OFDM symbol with the $n_g^{th}$ element of each orthogonal cover code of the pre-defined code set.

According to one or more embodiments of the present disclosure, the code division de-multiplexing unit is configured, for a code division multiplexed frequency domain vector of the $n_s^{th}$ OFDM symbol in the $n_g^{th}$ group, to multiply the code division multiplexed frequency domain vector of the $n_s^{th}$ OFDM symbol with the $n_g^{th}$ element of each of one or more orthogonal cover codes that are assigned to the one or more terminal devices from the pre-defined code set respectively. In some embodiments, the network device may informs, via PRACH configuration, a terminal device of the orthogonal cover code that is assigned to it.

The detecting unit 750 is configured to detect the one or more random access preambles based on signals after the code division de-multiplexing. According to one or more embodiments of the present disclosure, each of the detected one or more random access preambles comprises a plurality of identical random access sequences.

According to one or more embodiments of the present disclosure, on the terminal side, an orthogonal cover code is selected for the UE to perform code division multiplexing with respect to the grouped random access sequences of the preamble in a frequency domain. In this way, the random access collision probability would be decreased due to the extension of code domain, such that the random access capacity can be well improved without much loss on the performance.

In general, the various exemplary embodiments may be implemented in hardware or special purpose circuits, software, logical or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block and signaling diagrams, it in well understood that these blocks, apparatus, systems, techniques or methods described herein may be implemented in, as non-limiting examples, hardware, software, firmware, special purpose circuits or logical, general purpose hardware or controller or other computing devices, or some combination thereof.

As such, it should be appreciated that at least some aspects of the exemplary embodiments of the disclosure may be practiced in various components such as integrated circuit chips and modules. As well known in the art, the design of integrated circuits is by and large a highly automated process.

The present disclosure may also be embodied in the computer program product which comprises all features capable of implementing the method as depicted herein and may implement the method when loaded to the computer system.

The present disclosure has been specifically illustrated and explained with reference to the preferred embodiments. The skilled in the art should understand various changes thereto in form and details may be made without departing from the spirit and scope of the present disclosure.

What is claimed is:

1. A method for operating a terminal device, the terminal device transmitting a random access preamble in a transmitting sub-frame, the sub-frame comprising a number of OFDM, Orthogonal Frequency-Division Multiplexing, symbols in a time domain, the method comprising:
creating a sequence that comprises a plurality of random access sequences;
dividing the plurality of random access sequences into a number $N_c$ of groups, each of the groups including two or more random access sequences of the plurality of random access sequences, wherein the number of the groups is informed from a network device to the terminal device via PRACH, Physical Random Access CHannel, configuration;
performing code division multiplexing with respect to each of the groups of the plurality of random access sequences in a frequency domain, based on an orthogonal cover code selected for the terminal device from a pre-defined code set,
wherein performing code division multiplexing with respect to each of the groups of the plurality of random access sequences in a frequency domain, based on the orthogonal cover code selected for the terminal device from a pre-defined code set comprises:
for a frequency domain vector of the $n_s^{th}$ random access sequence in the $n_g^{th}$ group,
multiplying the frequency domain vector of the $n_s^{th}$ random access sequence with the $n_g^{th}$ element of the orthogonal cover code; and
transforming signals after the code division multiplexing into the time domain to generate the random access preamble for the terminal device.

2. The method according to claim 1, wherein the plurality of random access sequences is a plurality of identical random access sequences.

3. The method according to claim 1, wherein each random access sequence corresponds to each of the 01-DM symbols and has the same length as each one of the OFDM symbols.

4. The method according to claim 1, wherein the orthogonal cover code has a length of $N_c$.

5. The method according to claim 3, wherein dividing the plurality of random access sequences into a number $N_c$ of groups comprises:
dividing the plurality of random access sequences such that the size of the first $N_c-1$ groups is $N_{g_k}=\lfloor N_s/N_c \rfloor$, k={0, . . . ,$N_c-2$}, and the size of the last group is $$N_{g_{N_c-1}} = \lfloor N_s/N_c \rfloor + \mathrm{mod}(N_s, N_c),$$

wherein $N_s$ denotes the number of OFDM symbols in the sub-frame, $\lfloor x \rfloor$ denotes a floor function that rounds x to the nearest integer less than or equal to x; mod(x, y) denotes a modulo function that obtains the remainder after x is divided by y.

6. The method according to claim 1, wherein the orthogonal cover code for the terminal device is randomly selected by the terminal device or the network device selects the orthogonal cover code and informs the terminal device via the PRACH configuration.

7. A method for operating a network device, the network device receiving one or more random access preambles in a receiving sub-frame, the sub-frame comprising a number of OFDM, Orthogonal Frequency-Division Multiplexing, symbols in a time domain, the method comprising:
informing, via a physical random access channel, PRACH, configuration, one or more terminal devices of an orthogonal cover code that is assigned to the one or more terminal devices;
receiving a sub-frame carrying the one or more random access preambles used by the one or more terminal devices respectively, wherein each random access preamble comprises a plurality of code division multiplexed random access sequences;
dividing the OFDM symbols of the received sub-frame into a number $N_c$ of groups, each of the groups including two or more of the OFDM symbols;
processing the OFDM symbols within each of the groups to obtain a number $N_c$ of code division multiplexed frequency domain vectors from the number $N_c$ of groups;
performing code division de-multiplexing with respect to each element of each frequency domain vector of the number $N_c$ of code division multiplexed frequency domain vectors in a frequency domain based on a pre-defined code set and the orthogonal cover code that is assigned to the one or more terminal devices,
wherein performing code division de-multiplexing with respect to each element of each frequency domain vector of the number $N_c$ of code division multiplexed frequency domain vectors in the frequency domain based on a pre-defined code set comprises:
for a code division multiplexed frequency domain vector of the $N_s^{th}$ OFDM symbol in the $n_g^{th}$ group,
multiplying the code division multiplexed frequency domain vector of the $N_s^{th}$ OFDM symbol with the $n_g^{th}$ element of each of one or more orthogonal cover codes that are assigned to the one or more terminal devices from the pre-defined code set respectively; and
detecting the one or more random access preambles based on the received sub-frame after the code division de-multiplexing.

8. The method according to claim 7, wherein each of the detected one or more random access preambles comprises a plurality of identical random access sequences.

9. The method according to claim 7, wherein each random access sequence corresponds to each of the OFDM symbols and has the same length as each one of the OFDM symbols.

10. The method according to claim 7, wherein orthogonal cover codes of the pre-defined code set has a length of $N_c$.

11. The method according to claim 10, wherein dividing the OFDM symbols of the received sub-frame into a number $N_c$ of groups comprises:
dividing the OFDM symbols such that the size of the first $N_c-1$ groups is $N_{g_k}=\lfloor N_s/N_c \rfloor$, $k=\{0, \ldots, N_c-2\}$, and the size of the last group is $$N_{g_{N_c-1}} = \lfloor N_s/N_c \rfloor + \mathrm{mod}(N_s, N_c),$$

wherein $N_s$ denotes the number of OFDM symbols in the sub-frame, $\lfloor x \rfloor$ denotes a floor function that rounds x to the nearest integer less than or equal to x; mod(x,y) denotes a modulo function that obtains the remainder after is divided by y.

12. The method according to claim 7, wherein processing the OFDM symbols within each of the groups comprises:
for each of the number $N_c$ of the groups,
performing FFT, Fast Fourier Transform, and MF, Match Filtering, on each of at least two contiguous OFDM symbols within the group;
coherently combining signals resulted respectively from the at least two contiguous OFDM symbols.

13. A terminal device, the terminal device configured to transmit a random access preamble in a transmitting sub-frame, the sub-frame comprising a number of OFDM, Orthogonal Frequency-Division Multiplexing, symbols in a time domain, the terminal device comprising:
a sequence creating circuitry configured to create a sequence that comprises a plurality of random access sequences;
a grouping circuitry configured to divide the plurality of random access sequences into a number $N_c$ of groups, each of groups including two or more random access sequences of the plurality of random access sequences, wherein the number of the groups is informed from a network device to the terminal device via PRACH, Physical Random Access CHannel, configuration;
a code division multiplexing circuitry configured to perform code division multiplexing with respect to each of the groups of the plurality of random access sequences in a frequency domain, based on an orthogonal cover code selected for the terminal device from a pre-defined code set,
wherein performing code division multiplexing with respect to each of the groups of the plurality of random access sequences in a frequency domain, based on the orthogonal cover code selected for the terminal device from a pre-defined code set comprises:
for a frequency domain vector of the $n_s^{th}$ random access sequence in the $n_g^{th}$ group,
multiplying the frequency domain vector of the nhd $s^{th}$ random access sequence with the $n_g^{th}$ element of the orthogonal cover code; and
a transforming circuitry configured to transform signals after the code division multiplexing into the time domain to generate the random access preamble for the terminal device.

14. The terminal device according to claim 13, wherein the plurality of random access sequences is a plurality of identical random access sequences.

15. The terminal device according to claim 13, wherein each random access sequence corresponds to each of the OFDM symbols and has the same length as each one of the OFDM symbols.

16. The terminal device according to claim 13, wherein the orthogonal cover code has a length of $N_c$.

17. The terminal device according to claim 15, wherein the grouping circuitry is configured to divide the plurality of random access sequences such that the size of the first $N_c-1$ groups is $N_{g_k}=\lfloor N_s/N_c \rfloor$, $k=\{0, \ldots, N_c-2\}$, and the size of the last group is $$N_{g_{N_c-1}} = \lfloor N_s/N_c \rfloor + \mathrm{mod}(N_s, N_c),$$

wherein $N_s$ denotes the number of OFDM symbols in the sub-frame, $\lfloor x \rfloor$ denotes a floor function that rounds x to the nearest integer less than or equal to x; mod(x, y) denotes a modulo function that obtains the remainder after x is divided by y.

18. A network device, the network device configured to receive one or more random access preambles in a receiving sub-frame, the sub-frame comprising a number of OFDM, Orthogonal Frequency-Division Multiplexing, symbols in a time domain, the network device further comprising:
a transmitting circuitry configured to inform, via a physical random access channel, PRACH, configuration, one or more terminal devices of an orthogonal cover code that is assigned to the one or more terminal devices;
a receiving circuitry configured to receive a sub-frame carrying the one or more random access preambles used by the one or more terminal devices respectively, wherein each random access preamble comprises a plurality of code division multiplexed random access sequences;
a grouping circuitry configured to divide the OFDM symbols of the received sub-frame into a number $N_c$ of groups, each of the groups including two or more of the OFDM symbols;
an OFDM processing circuitry configured to process the OFDM symbols within each of the groups to obtain a number $N_c$ of code division multiplexed frequency domain vectors from the number $N_c$ of groups;
a code division de-multiplexing circuitry configured to perform code division de-multiplexing with respect to each element of each frequency domain vector of the number $N_c$ of code division multiplexed frequency domain vectors in a frequency domain based on a pre-defined code set and the orthogonal cover code that is assigned to the one or more terminal devices, wherein performing code division de-multiplexing with respect to each element of each frequency domain vector of the number $N_c$ of code division multiplexed frequency domain vectors in the frequency domain based on a pre-defined code set comprises:

for a code division multiplexed frequency domain vector of the $n_s^{th}$ OFDM symbol in the $n_g^{th}$ group, multiplying the code division multiplexed frequency domain vector of the $n_s^{th}$ OFDM symbol with the $n_g^{th}$ element of each of one or more orthogonal cover codes that are assigned to the one or more terminal devices from the pre-defined code set respectively; and a detecting circuitry configured to detect the one or more random access preambles based on the received subframe after the code division de-multiplexing.

19. The network device according to claim 18, wherein each of the detected one or more random access preambles comprises a plurality of identical random access sequences.

20. The network device according to claim 18, wherein each random access sequence of the random access preamble corresponds to each of the OFDM symbols and has the same length as each one of the OFDM symbols.

21. The network device according to claim 18, wherein orthogonal cover codes of the pre-defined code set has a length of $N_c$.

22. The network device according to any of claim 18, wherein the OFDM processing circuitry is configured to:

for each of the number $N_c$ of the groups, perform FFT, Fast Fourier Transform, and MF, Match Filtering, on each of at least two contiguous OFDM symbols within the group;

coherently combine signals resulted respectively from the at least two contiguous OFDM symbols.

23. The network device according to claim 20, wherein the code division de-multiplexing circuitry is configured to:

for a code division multiplexed frequency domain vector of the $n_s^{th}$ OFDM symbol in the $n_g^{th}$ group, multiply the code division multiplexed frequency domain vector of the $n_s^{th}$ OFDM symbol with the $n_g^{th}$ element of each orthogonal cover code of the pre-defined code set.

* * * * *